United States Patent [19]
Economou

[11] 3,885,559
[45] *May 27, 1975

[54] PROCESS FOR THE REDUCTION OF PAIN IN THE REMOVAL OF ADHESIVE TAPES AND BANDAGES

[76] Inventor: George J. Economou, 8 Elm St., Norton, Mass. 02110

[ * ] Notice: The portion of the term of this patent subsequent to May 21, 1991, has been disclaimed.

[22] Filed: Mar. 29, 1974

[21] Appl. No.: 456,435

Related U.S. Application Data

[63] Continuation-in-part of Ser. No. 274,449, July 24, 1972, Pat. No. 3,811,438, which is a continuation-in-part of Ser. No. 239,688, March 30, 1972, abandoned.

[52] U.S. Cl. ............................................. 128/156
[51] Int. Cl. ........................................... A61l 15/00
[58] Field of Search ........................... 128/156, 155

[56] References Cited
UNITED STATES PATENTS

| | | | |
|---|---|---|---|
| 2,399,545 | 4/1946 | Davis | 128/156 |
| 3,073,304 | 1/1963 | Schaar | 128/156 |
| 3,085,572 | 4/1963 | Blackford | 128/156 |
| 3,245,855 | 4/1966 | Stenuall | 128/156 X |
| 3,528,417 | 9/1970 | Gardner et al. | 128/156 |
| 3,811,438 | 5/1974 | Economou | 128/156 |

*Primary Examiner*—Richard A. Gaudet
*Assistant Examiner*—J. Yasko
*Attorney, Agent, or Firm*—Richard P. Crowley

[57] ABSTRACT

A process for the reduction of pain in the removal of adhesive tapes and bandages which comprises applying to a region of receptor cells, such as in human skin, adhesive tapes and bandages comprising a flexible backing with an adhesive portion distributed and adhered thereon in the form of adhesive layers alternately spaced with regions of lesser adhesiveness, such as no adhesiveness or lesser adhesive or no adhesive, therebetween, each region of lesser adhesiveness generally of a width less than each adjacent successive layer of adhesive, with each region having a minimum width of about 0.02 inches, and removing such tapes and bandages to provide successive stimuli to cells in the receptor region so as to reduce the frequency-dependent responsiveness of the cells, thereby reducing the pain in removal.

24 Claims, 6 Drawing Figures

PATENTED MAY 27 1975　　　　　　　　　　　　　　3,885,559
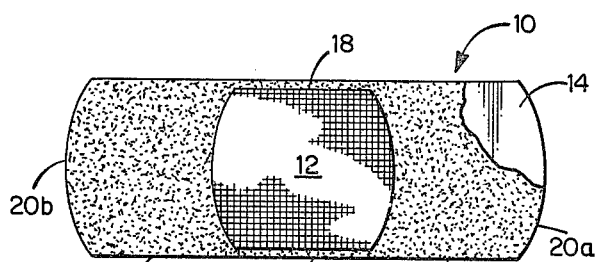
Fig. 1. PRIOR ART BANDAGE
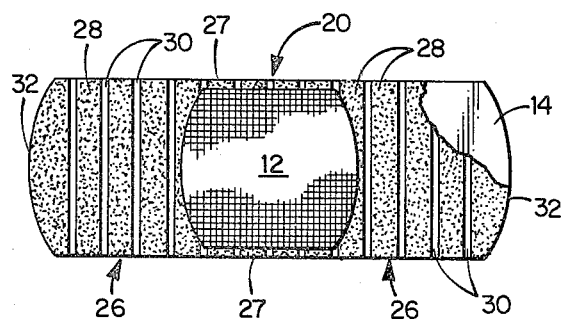
Fig. 2.
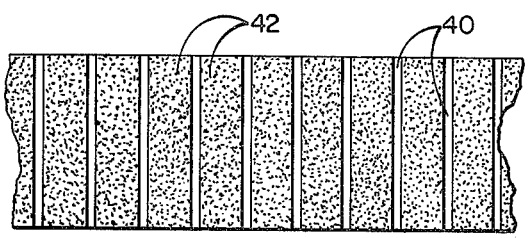
Fig. 3.
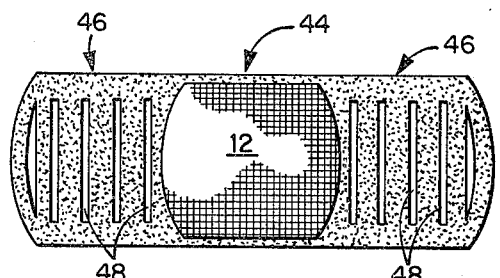
Fig. 4.
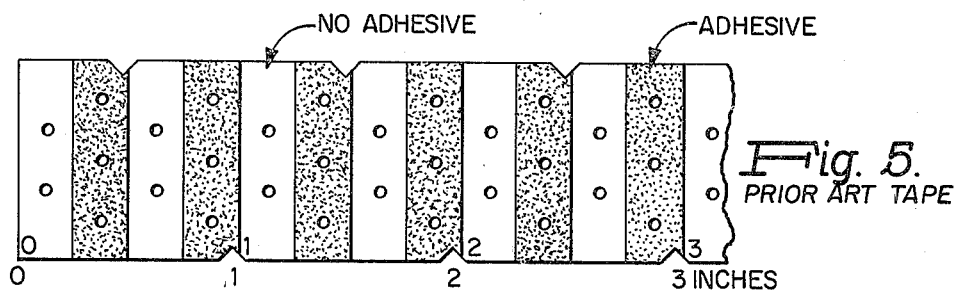
Fig. 5. PRIOR ART TAPE
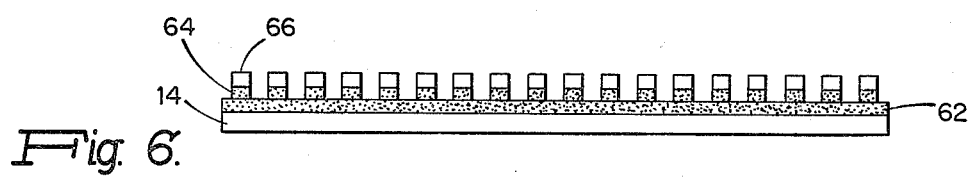
Fig. 6.

3,885,559

PROCESS FOR THE REDUCTION OF PAIN IN THE REMOVAL OF ADHESIVE TAPES AND BANDAGES

REFERENCE TO PRIOR APPLICATIONS

This application is a continuation-in-part application of U.S. Ser. No. 274,449, filed July 24, 1972, (now U.S. Pat. No. 3,811,438 issued May 21, 1974) which is a continuation-in-part of U.S. Ser. No. 239,688, filed Mar. 30, 1972 (now abandoned).

FIELD OF INVENTION

This invention relates to adhesive tapes and bandages, and particularly to improved adhesive arrangements therefor, and a process for reducing the pain of removal of such adhesive tapes and bandages.

BACKGROUND OF THE INVENTION

Conventional adhesive tapes are available in many types, sizes and shapes, comprising a functional or decorative flexible backing of fabric, paper, plastic, or similar material generally with a somewhat smooth adhesive coating thereon which is typically pressure-sensitive. Other types may, however, include adhesives activated by solvent or heat. In adhesive bandages, an absorbent pad or dressing is provided, with marginal adhesive portions for securing the pad over the intended surface. Strip bandages are typically removed by pulling an edge of a marginal portion so that tape and then pad and then tape are successively removed. The removal of conventional tapes and bandages with a continuous somewhat smooth adhesive surface very often causes sudden pain or discomfort to the user.

Commercially available bandages and surgical dressings are normally packaged in disposable envelopes and are provided with protective release-coated facings which are removed so as to expose the adhesive prior to use. In adhesive tapes, protective facings are not generally used, except to permit the material to be printed, punched or otherwise manipulated.

U.S. Pat. No. 2,339,545 shows an adhesive tape characterized by equally spaced indents along the outer edges in order to tear the tape across such indents. This prior art patent facilitates removal by reducing relative to conventional tapes up to fifty percent of the adhesive surface area, and provides for various adhesive/no adhesive layers, thereby minimizing removal pain by having in structure less skin-adhesive interface.

SUMMARY OF THE INVENTION

It is an object of this invention to provide improved adhesive tapes and bandages which are readily removable with reduced physiological pain or discomfort to the user.

Another object is to provide tapes and bandages with regions of lesser adhesiveness which may improve air ventilation and circulation adjacent the skin, while still providing satisfactory adhesion and a reduction of pain or discomfort in removal.

A further object is to provide a method of converting conventional adhesive tapes and bandages to the improved tapes and bandages of this invention.

The invention features a process for the application and removal with reduced pain or discomfort to the user of an adhesive tape comprising a backing and a plurality of adhesive layers distributed and adhered to said backing. These layers are alternately spaced with regions of lesser adhesiveness, such as no adhesiveness or lesser adhesive or no adhesive, therebetween for applications including the securing of an absorbent pad or dressing about a wound. Additionally, the layers may be of varied adhesive or adhesiveness. The adhesive layers and regions of lesser adhesiveness alternate along the tape in the expected direction of removal from areas adjacent a wound. The criteria of design include that each region of lesser adhesiveness generally be of width less than each adjacent layer of adhesive and that the minimum width of each region of lesser adhesiveness be approximately 0.02 inches.

In a preferred strip bandage embodiment of the process, the adhesive layers extend across the entire width of the tape as do the regions of lesser adhesiveness. These layers and regions are preferably straight and substantially perpendicular to the longitudinal edges of the tape and the expected direction of removal of the tape by the user.

Additionally, tapes constructed according to the invention may provide improved holding for particular combining or supporting applications. These tapes may be double-faced; i.e., adhesive portions on both sides.

Other objects, features and advantages will be apparent to one skilled in the art from the following description of preferred embodiments of the invention, taken together with the attached drawings thereof, in which:

DESCRIPTION OF THE DRAWINGS

FIG. 1 is a diagrammatic plan view of a prior art adhesive strip bandage, with a portion of the somewhat smooth adhesive layer removed to display the backing strip;

FIG. 2 is a diagrammatic plan view of an adhesive strip bandage constructed in accordance with this invention, again with a portion of the adhesive portion removed to display the backing strip;

FIG. 3 is a diagrammatic plan view of an adhesive tape constructed in accordance with this invention;

FIG. 4 is a diagrammatic plan view of another embodiment of an adhesive strip bandage constructed in accordance with this invention;

FIG. 5 is a diagrammatic plan view of a prior art adhesive tape drawn as a composite of the text and FIGS. 2 and 4 of U.S. Pat. No. 2,399,545 by B. E. Davis; and FIG. 6 is a schematic vertically enlarged cross-sectional side view of one tape of this invention.

DESCRIPTION OF THE PREFERRED EMBODIMENTS

FIG. 1 shows a prior art conventional adhesive strip bandage 10 which comprises an absorbent pad 12 (typically a gauze material) secured to a tape backing strip 14, with opposed marginal portions 16 and thin edge portions 18 having a continuous somewhat smooth pressure-sensitive adhesive surface. This bandage is removed by grasping edge 20a of marginal portion 16 and stripping off the contacted bandage from edge 20a to opposing edge 20b.

FIG. 2 shows my improved adhesive strip bandage 20 which similarly contains an absorbent pad 12 and a tape backing strip 14, with opposed marginal portions 26 and edge portions 27 having pressure-sensitive adhesive. Each marginal portion 26 and edge portion 27, however, contains a plurality of straight layers 28 of adhesive and a plurality of straight regions 30 of lesser adhesiveness alternating therebetween, so that layers 28 and regions 30 form a segmented adhesive portion. The regions 30 may be uncoated regions of the tape backing strip, or be of lesser adhesiveness or lesser adhesive than that in layers 28, or be as adhesive layer 28 rendered substantially inert, or be covered with coatings or permanent facings of lesser adhesiveness overlying and adhering to a somewhat smooth adhesive surface beneath. The regions and layers are generally parallel and may be straight, angled or curved.

In all of these constructions, the resultant adhesive portion consists of adhesive layers alternately spaced with regions of lesser adhesiveness, such as no adhesiveness or lesser adhesive or no adhesive, therebetween. My adhesive bandage comprising a tape which has an adhesive portion of segmented adhesiveness as in FIG. 2 is applied to human skin which contains receptor cells, and which tape is removed by pulling an edge 32 of a marginal portion 26 generally over and towards the remaining adhered portion of the tape where removal, in fact, is segmented between each successive layer 28 and region 30. The removal time between each successive layer and region is of the order of a fractional second. The frequencies of "stripping" in removal are determined by the selected adhesive layers which may be of equal, as shown, or of varied dimensions and the selelcted regions of lesser adhesiveness which may also be of equal, as shown, or of varied dimensions.

Satisfactory results are obtained using a width equal to 0.03 inches for each region of lesser adhesiveness with widths of adjacent layers of adhesive equal to 0.04 inches. With such a construction wherein one stripping cycle extends in the direction of removal, from the leading edge of one region to the corresponding edge of the following region, one obtains a spatial frequency of stripping equal to about fourteen cycles per linear inch. It should be noted that these spatial frequencies of stripping need not be constant over any interval greater than one cycle. An expected minimum width for any region of lesser adhesiveness is about 0.02 inches and the width of any layer of adhesive should not generally exceed 0.25 inches. A region can have one or more subdivisions having varying degrees of lesser adhesiveness; i.e., the region need not be uniform in lesser adhesiveness; e.g., a region may have no adhesive in part, and also in part, lesser adhesiveness than an adjacent layer in part.

For providing removal as according to the present invention, the lower limit for a constant spatial frequency of stripping over a one-inch interval is approximately 4 cycles per linear inch, the upper limit being approximately 25 cycles per linear inch. Of course, the invention is not limited to spatial frequencies less than 25 cycles per linear inch, and may also comprise several different frequencies or ranges of frequencies as already indicated.

A plurality of ventilation zones across the width of the tape may be inherently or expressly provided at the regions, allowing air to circulate more freely about the skin. In prior art conventional bandages, perforations provided through the adhesive coating and tape backing for such purposes are not interconnected to allow a flow of air between them. Such perforations may, however, also be provided in the embodiment of my invention to provide more effective ventilation. Adhesive bandages and adhesive tapes constructed according to the invention may additionally provide better body contouring with less strain during movement by gathering of some of the backing material within the regions.

FIG. 3 shows an adhesive tape constructed in accordance with the present invention, with regions of lesser adhesiveness 40 alternately spaced with adhesive layers 42 therebetween. It will be seen that removal of this tape from the skin of the user offers the same advantages as stated for the bandage 20 in FIG. 2.

FIG. 4 shows an alternate embodiment of an adhesive strip bandage 44 with an absorbent pad 12 and marginal adhesive portions 46, each of which comprises a series of shortened regions 48. Such bandages offer many of the advantages of the bandage of FIG. 2, particularly ease of removal and reduction of pain and discomfort in removal.

FIG. 5 shows a prior art adhesive tape drawn as a composite of the text and FIGS. 2 and 4 of U.S. Pat. No. 2,399,545, wherein removal is facilitated by reducing up to 50 percent of the adhesive surface area relative to conventional tapes having a continuous somewhat smooth adhesive surface, and resulting in a constant low spatial frequency construction of approximately two cycles per linear inch. This prior art adhesive tape has spaced bands, or areas, of adhesive coating greatly to reduce the overall adhesive surface area, thereby economizing in adhesive material and minimizing removal pain by having less skin-adhesive interface. Such tapes minimize pain solely by the reduction in adhesive surface area. My invention provides for tapes and bandages as illustrated which consider and are based upon the frequency-dependent sensitivity of reception of mechanical stimuli by receptor cells in skin and by receptor-effector mechanisms in the physiology of pain.

At the periphery or within all organs in vertebrates, such as humans, in which active or passive movements occur, there are mechanoreceptors which constitute receptor-effector mechanisms which provide information of external stimuli. These receptors are in effect tranducers which convert mechanical energy into electrical energy. Some are capable of sensing mechanical displacement amplitudes on the order of 0.0001 millimeters. I have found that an adhesive surgical tape being removed from the skin excites, via movement and tension, receptor cells which initiate so-called generator potentials (current) and, if above a threshold level, will cause the discharge of nerve impulses, resulting in pain or discomfort. Receptor cells are ubiquitous in skin and their excitability is frequency-dependent.

Most important in receptor-effector mechanisms is the refractory trail phenomenon having a trailing period of depression of excitability or diminution of responsiveness to mechanical stimuli. During a time interval after conditioning stimulation, the receptors are less responsive to further immediate stimulation and for stimuli of equal strength the amplitude of any response falling on the refractory trail is reduced. To paraphrase, the sensitivity of reception to stimuli in the physiology of pain decreases as the time interval between stimuli is reduced and is frequency-dependent upon removal of my adhesive tapes which have an adhesive portion of segmented adhesiveness and which provide successive stimuli to the receptor cells (Loewenstein, W. R. et al., Jour. of Gen. Physiology, 41, 805 and 825 (1958) and 43, 335 and 347 (1959)).

The bands or areas of no adhesive of prior art tapes, such as FIG. 5, which reduce skin-adhesive interface, provide for relatively large time intervals between stimuli at which the refractory trail phenomenon is least effective, if at all. My tapes and bandages consider and are constructed based on the principles of the physiology of pain: the phenomonon of refractoriness and use of higher frequencies of stripping with associated narrow regions of lesser adhesiveness in the process to reduce pain in removal.

The spatial frequency in the tapes of FIG. 5 is low, while the longitudinal band constructions of conventional tapes and bandages (FIG. 1) are of zero frequency. My invention comprises an adhesive tape having high spatial frequencies; e.g., about 4 to 25 cycles per linear inch, and in addition, my tapes are characterized by narrow pulse widths. I have found that the combination of high stripping frequencies with narrow pulse widths provides a remarkable degree of diminution of pain or discomfort to a subject when removing such adhesive tapes.

FIG. 6 is a schematic vertically enlarged cross-sectional side view of a tape of this invention, wherein a conventional tape has been overprinted or coated with a material of lesser adhesiveness. By this technique, conventional tapes may be converted to tapes which provide for high stripping frequencies according to my invention. As shown, 14 is a tape backing, 62 a continuous somewhat smooth adhesive layer typically employed on tapes, a thin stripe of flexible facing material 66, such as backing 14, and an adhesive layer 64. Of course, if desired, the facing material may be secured to backing 14 through adhesive 62.

A conventional adhesive tape is converted to a tape of this invention by employing thin strips of conventional tapes; i.e., tape having a continuous adhesive layer, and adhering them in an adhesive-to-adhesive manner as illustrated in FIG. 6. The tapes of this embodiment comprise a flexible backing with a somewhat smooth adhesive portion or layer with permanent facings; e.g., of thin backing or sheet material of lesser adhesiveness overlying and adhering to the adhesive portion.

My invention has been described in connection with adhesive tapes; however, the inventive concepts herein may be employed on any backing having an adhesive portion, and the term "adhesive tape" comprises adhesive bandages, gauze rolls and elastic bandages coated with an adhesive coating, etc. My tapes and bandages may be applied to any receptor region, such as and particularly human or animal skin, where the reduction in pain or discomfort is desired, or to other surfaces where small time intervals between stimuli are desired.

Other embodiments will occur to those skilled in the art and are within the following claims.

What is claimed is:

1. A process for the reduction of pain or discomfort in the removal of a tape from a receptor region comprising receptor cells, which process comprises removing an adhesive tape from a receptor region of receptor cells subject to excitation by stimuli, which tape comprises a backing and an adhesive portion comprising a plurality of adhesive layers and a plurality of regions of lesser adhesiveness, the layers adhered with the regions of lesser adhesiveness between such layers, the regions and layers being straight and successively alternating along the longitudinal length of said backing, each layer and each region characterized generally by a uniform width and having a minimum width of about 0.02 inches, the number of said layers or regions per linear inch of tape being from 4 to about 25, the removal being generally perpendicular to the longitudinal edges of the tape, thereby reducing frequency-dependent responsiveness of the receptor cells upon removal of the contacted tape.

2. The process of claim 1 wherein each said region is characterized by a width less than the width of said successive adjacent layer.

3. The process of claim 1 wherein said tape comprises said layers and regions which are angled.

4. The process of claim 1 wherein said tape comprises said layers and regions which are curved.

5. The process of claim 1 wherein said regions extend across the entire width of said backing.

6. The process of claim 1 wherein said regions extend less than across the entire width of said backing.

7. The process of claim 1 wherein said regions of lesser adhesiveness comprise permanent facings adhering to adhesive on said backing.

8. The process of claim 1 wherein said regions of lesser adhesiveness comprise an adhesive of lesser adhesiveness than the adhesive of said layers.

9. The process of claim 1 wherein said regions of lesser adhesiveness comprise regions of no adhesiveness.

10. The process of claim 1 which comprises an absorbent body portion secured thereon.

11. The process of claim 1 wherein the said regions comprise regions of lesser adhesive.

12. The process of claim 1 wherein the said regions comprise regions of no adhesive.

13. The process of claim 1 wherein the said regions include a flexible facing adhered to an underyling continuous somewhat smooth adhesive coating.

14. The process of claim 1 wherein said regions include a flexible facing composed of the backing material adhered by adhesive-to-adhesive contact with an underlying somewhat smooth adhesive coating.

15. The process of claim 1 wherein the width of each of said layers of adhesive does not exceed 0.25 inches.

16. The process of claim 1 wherein the width of each of said regions is about 0.03 inches.

17. The process of claim 1 wherein the said regions vary in adhesiveness within each of the regions.

18. The process of claim 1 wherein the regions and layers extend across the entire width of the tape, and the regions and layers being straight and alternating along the longitudinal length of the backing, all regions and layers being of the same width.

19. The process of claim 1 wherein said tape comprises a backing and an adhesive portion having a plurality of said layers and regions on both sides of said backing.

20. The process of claim 1 wherein said layers vary in adhesive.

21. The process of claim 1 wherein said layers vary in adhesiveness.

22. The process of claim 1 wherein each of said layers varies in adhesive.

23. The process of claim 1 wherein each of said layers varies in adhesiveness.

24. A process for the reduction of pain or discomfort in the removal of a tape from a receptor region comprising receptor cells, which process comprises removing an adhesive tape from a receptor region of receptor cells subject to excitation by stimuli, which tape comprises a backing and an adhesive portion comprising a plurality of adhesive layers and a plurality of regions of no adhesive, the layers adhered with the regions of no adhesive between such layers, the regions and layers being straight and successively alternating along the longitudinal length of said backing, each layer and each region characterized generally by a uniform width and having a minimum width of about 0.02 inches, the width of each layer being less than 0.25 inches, the number of said layers or regions per linear inch of tape being from 4 to about 25, each region extending across the entire width of said backing, and the tape including an absorbent body portion secured thereon, thereby reducing frequency-dependent responsiveness of the receptor cells upon removal of the contacted tape from the receptor region.

* * * * *